United States Patent
Palenius (10) Patent No.: US 10,469,111 B2
(45) Date of Patent: Nov. 5, 2019

(54) RADIO RECEIVER CONTROL IN HIGH SPEED SCENARIO

(71) Applicant: Telefonaktiebolaget LM Ericsson (publ), Stockholm (SE)

(72) Inventor: Torgny Palenius, Barsebäck (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/320,406

(22) PCT Filed: Aug. 12, 2016

(86) PCT No.: PCT/EP2016/069275
§ 371 (c)(1),
(2) Date: Jan. 24, 2019

(87) PCT Pub. No.: WO2018/028796
PCT Pub. Date: Feb. 15, 2018

(65) Prior Publication Data
US 2019/0268030 A1    Aug. 29, 2019

(51) Int. Cl.
*H04B 1/10* (2006.01)
*H04L 25/02* (2006.01)

(52) U.S. Cl.
CPC ....... *H04B 1/1027* (2013.01); *H04L 25/0222* (2013.01); *H04B 2001/1072* (2013.01)

(58) Field of Classification Search
CPC .................. H04B 1/1027; H04B 2001/1072
See application file for complete search history.

(56) References Cited

U.S. PATENT DOCUMENTS

| 2001/0041536 | A1 | 11/2001 | Hasegawa |
| 2008/0013649 | A1* | 1/2008 | Engdahl .............. H04L 25/0212 375/344 |
| 2008/0014881 | A1* | 1/2008 | Engdahl ............... H04B 1/7117 455/187.1 |
| 2009/0305642 | A1 | 12/2009 | Ezaki |
| 2012/0034917 | A1 | 2/2012 | Kazmi |
| 2018/0123834 | A1* | 5/2018 | Kim ........................ H04L 25/02 |

OTHER PUBLICATIONS

R4-060585; Nortel—Introduction of requirements for high speed train environment; TSG-RAN Working Group 4 (Radio) meeting #39 Shanghai, China, May 8-12, 2006; Consisting of 4 pages.
R4-157700; Huawei, HiSilicon—Enhance UE performance under SFN scenario; 3GPP TSG-RAN WG4 Meeting #77 Anaheim, CA, US, Oct. 16-20, 2015; Consisting of 5 pages.

(Continued)

*Primary Examiner* — Nguyen T Vo
(74) *Attorney, Agent, or Firm* — Christopher & Weisberg, P.A.

(57) ABSTRACT

A wireless communication device detects when the wireless communication device is in a high speed environment, e.g., on a high speed train, and detects whether the behavior of the automatic frequency control (AFC) shall be changed since the AFC behavior is not stable. Receiver algorithms, i.e., the AFC, are changed such that an optimization for the high speed environment is obtained, without any risk of degrading the performance in all other fading environments.

15 Claims, 5 Drawing Sheets

(56) References Cited

OTHER PUBLICATIONS

RP-141849; NTT DOCOMO, Inc., Huawei, HiSilicon—Motivation of New SI proposal: Performance enhancements for high speed scenario; 3GPP TSG RAN Meeting #66 Maui, Hawai (US), Dec. 8-12, 2014; Consisting of 4 pages.
International Search Report and Written Opinion dated Nov. 5, 2017, for corresponding International Application No. PCT/EP2016/069275, International filing date; Aug. 12, 2016; consisting of 9 pages.

* cited by examiner

RADIO RECEIVER CONTROL IN HIGH SPEED SCENARIO

CROSS-REFERENCE TO RELATED APPLICATIONS

This application is a Submission Under 35 U.S.C. § 371 for U.S. National Stage Patent Application of International Application Number: PCT/EP2016/069275, filed Aug. 12, 2016 entitled "RADIO RECEIVER CONTROL IN HIGH SPEED SCENARIO," the entirety of which is incorporated herein by reference.

TECHNICAL FIELD

Embodiments herein relate to wireless communication and more specifically to downlink signal processing control in a scenario where wireless communication devices are moving at high speeds.

BACKGROUND

Wireless communication systems, i.e. systems that provide communication services to wireless communication devices such as mobile phones, smartphones (often denoted by UE that is short for user equipment) as well as machine-type communication (MTC) devices, have evolved during the last decade into systems that must utilize the radio spectrum and other system resources in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train.

To meet this demand, within the third generation partnership project (3GPP) work is being done regarding possible enhancements to radio resource management, RRM, performance in high speed train (HST) environments. The justification is that there are railways such as Japan Tohoku Shinkansen (running at 320 km/h), German ICE (330 km/h), AGV Italo (400 km/h), and Shanghai Maglev (430 km/h) at which vehicles travel at greater speed than 300 km/h and where there is demand for using mobile services.

With increased deployment of high speed train lines, increased number of UE users, and increased usage of bandwidth per user, dominating network operators are requesting improved UE performance and support for speeds exceeding 300 km/h. Future high speed trains are expected to travel at speeds above 500 km/h, e.g. the Superconducting Magnetic Levitation train (SCMaglev) to be deployed in Japan, where train sets have already in April 2015 reached more than 600 km/h in speed tests.

For the development of the fifth generation of mobile telecommunication technology (5G), the International Telecommunication Union (ITU) has defined a set of requirements, IMT-2020, which includes the support of UE speeds of above 500 km/h with respect to mobility and data communication.

Apart from the relatively shortened time for detecting suitable neighbor cells for handover or cell reselection, high speed movement of the UE may also lead to significant Doppler shifts of the received radio signals. Such a Doppler shift forces the UE to increase its demodulation frequency when moving towards a cell (i.e. moving towards an antenna that defines a radio lobe of the cell), and decrease demodulation frequency when moving away from a cell, in order to maintain an acceptable receiver performance.

The Doppler shift can be expressed as:

$$\Delta f = \frac{v}{c} f_c$$

where c is the speed of light, v is the relative velocity of the UE towards the transmitting antenna and $f_c$ is the transmitted frequency.

The magnitude of the Doppler shift depends on the relative velocity of the UE towards the transmitting antenna in a cell. Consequently, with transceivers located close to a path along which an UE is moving, i.e., a small angle between the trajectory of the UE and the line between the UE and the transmitting antenna, a substantial part of the UE velocity will transfer into a Doppler shift. Moreover there will be an abrupt change of sign of the Doppler shift when the UE passes the transmitting antenna and the smaller the angle, the more abrupt is the change from positive to negative Doppler shift.

Each radio propagation path may have its own Doppler shift, depending on how the radio waves travel between the transmitting antenna and the UE. In case of line-of-sight there is one dominant path from each transmitter, whereas in e.g. urban areas there is generally scatter (reflections) due to buildings to which the UE has a relative velocity, giving rise to multiple paths for the signal to propagate to the UE, each with a different Doppler shift. Since the received signal (in general) is the superposition of those paths, it gives rise to Doppler spread which degrades radio receiver performance by smearing out the signal in the frequency domain hence causing inter-carrier interference.

High-speed railway track sections are generally using dedicated platforms often elevated above the landscape or city beneath. Hence, there are few objects that can cause a significant Doppler spread; with cell sites located along the track line-of-sight will be dominating at least between the cell site and the train. Moreover, in built-up areas as well as when a train is approaching or passing stations the speed is generally restricted of concern for public safety and disturbing noise, and as a consequence the Doppler shift becomes small.

Figure 1:
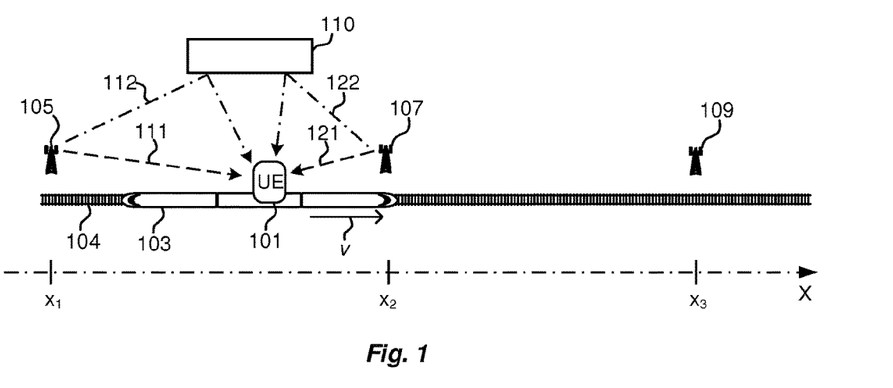
FIG. 1 schematically illustrates a high speed environment.

Needless to say, there are a number of challenges related to radio receiver control in relation to high-speed train scenarios in prior art. For example, with reference to FIG. 1, an UE 101 traveling on a train 103 at high speed v on a railway track 104 along a path and being at a position between two antenna nodes 105, 107, e.g. remote radio heads (RRH), located along the railway track 104 as indicated in FIG. 1, will receive the same signal from at least two directions (i.e. a bidirectional scenario) with opposite Doppler shifts. Such signals are illustrated by line-of-sight (LOS) signals 111, 112 and signals 112 and 122 have other Doppler shifts having been reflected by a structure 110.

This gives rise to a Doppler spread also in the line-of-sight case, due to one path with maximum positive Doppler Shift and one path with maximum negative Doppler Shift. These very large Doppler shifts degrade the receiver performance when signals from both antenna nodes 105, 107 are received with about the same strength. In such a bidirectional deployment between two antenna nodes, the UE receives two signals with very different Doppler frequency shifts, and when the UE is closer to one of the antenna nodes, the signals that travel different signal paths will be received at different times. One of the paths will be stronger than the other one based on the geometry of the situation. Therefore the UE will see two paths with different power due to the geometry, different time due to the different propagation conditions and different frequency due to the sign of the speed relative to the two antenna nodes.

The UE 101 receiver tracks the received frequency with its automatic frequency control (AFC) loop based on its received signals. However, with receivers developed for low speed channels the AFC will not be stable during a period when the UE is between two antenna nodes. Other prior art receivers are discussed in the 3GPP technical report from the Release-13 Study Item on high speed trains, 36.878, v13.0.0 and in the contribution [R4-157700] to 3GPP Radio Access Network workgroup 4 (RAN 4). These radio receivers comprise AFC algorithms that are much more complex than low speed AFC algorithms and they also utilize a special channel estimation for demodulation. A drawback with such prior art receivers and AFC algorithms is, in addition to the fact that the AFC algorithms are very complex, that the AFC algorithms are specifically proposed for the HST bidirectional deployment and they are suitable for use only in a HST environment. The behavior of the AFC algorithms in other environments than in HST environments will with high probability be worse than low-speed algorithms.

SUMMARY

In view of the above, an object of the present disclosure is to overcome or at least mitigate at least some of the drawbacks related to AFC control in a HST scenario.

This is achieved in a first aspect by a method performed by a wireless communication device. The method is for controlling a radio receiver that is receiving radio frequency (RF) signals in the wireless communication device. The method comprises determining that the wireless communication device is located in a high speed (HS) environment. As a consequence of the determination that the wireless communication device is located in the HS environment, a determination is made that a first AFC function operating on the RF signals is unstable and, as a consequence of the determination that the first AFC function is unstable, the radio receiver is switched to operate a second AFC function on the RF signals and, in some embodiments the switching is accompanied by adapting demodulation of the RF signals to the second AFC function.

In other words, the wireless communication device detects when the wireless communication device is in a HS environment, e.g. on a high speed train, and detects whether the behavior of the AFC, and in some embodiments also the demodulation, shall be changed since the AFC behavior is not stable.

An advantage of such a procedure is that receiver algorithms, i.e., the AFC, are changed such that an optimization for the high speed environment is obtained, without any risk of degrading the performance in all other fading environments. That is, with this procedure controlling receiver algorithms, the behavior of the wireless communication device in all other fading environments is unchanged with the known behavior while when it is in this very specific high speed environment, the algorithms are based on the high speed behavior.

The determination that the first AFC function is unstable may comprise a determination that frequency error estimations by the first AFC function have an undesirable variation. For example, in some embodiments this determination may comprise an estimation of a variance of differences between a number, N, of frequency error estimations of the RF signals by the first AFC function. The variance is compared with a first variance threshold.

A determination is then made, if the variance is greater than the first variance threshold, that the frequency error estimations by the first AFC function have an undesirable variation.

In some embodiments, the first variance threshold is a fixed value based on a sum of at least one estimated variance and a predetermined variance margin, and in some embodiments the first variance threshold is an adaptive value based on a plurality of estimated variances.

The second AFC function may, in various embodiments, be any of a fixed frequency and a slow frequency control function.

In some embodiments, the radio receiver is being controlled to operate the second AFC function on the RF signals by comparing the estimated variance with a second variance threshold and, if the estimated variance is less than the second variance threshold, switch the radio receiver to operate the first AFC function on the RF signals.

Embodiments include those wherein the determination that the wireless communication device is located in a HS environment comprises a determination that the radio receiver receives the RF signals via a plurality of reception paths. A determination is then made that the received RF signals have a respective Doppler shift separated by a frequency that is larger than a frequency threshold, f_Thr.

In another aspect there is provided a wireless communication device comprising a radio receiver. The radio receiver is configured to receive RF signals in the wireless communication device. The wireless communication device comprises radio frequency circuitry, a processor and a memory. The memory contains instructions executable by the processor whereby the wireless communication device is operative to:

determine that the wireless communication device is located in a high speed, HS, environment and, as a consequence of the determination that the wireless communication device is located in the HS environment, determine that a first automatic frequency control, AFC, function operating on the RF signals is unstable and, as a consequence of the determination that the first AFC function is unstable, and control the radio receiver to operate a second AFC function on the RF signals.

In another aspect there is provided a computer program, comprising instructions which, when executed on at least one processor in a wireless communication device, cause the wireless communication device to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

BRIEF DESCRIPTION OF THE DRAWINGS

FIG. 5 is a flowchart of a method,
FIG. 6 schematically illustrates a wireless communication device, and
FIG. 7 schematically illustrates a wireless communication device.

DETAILED DESCRIPTION

Figure 2:
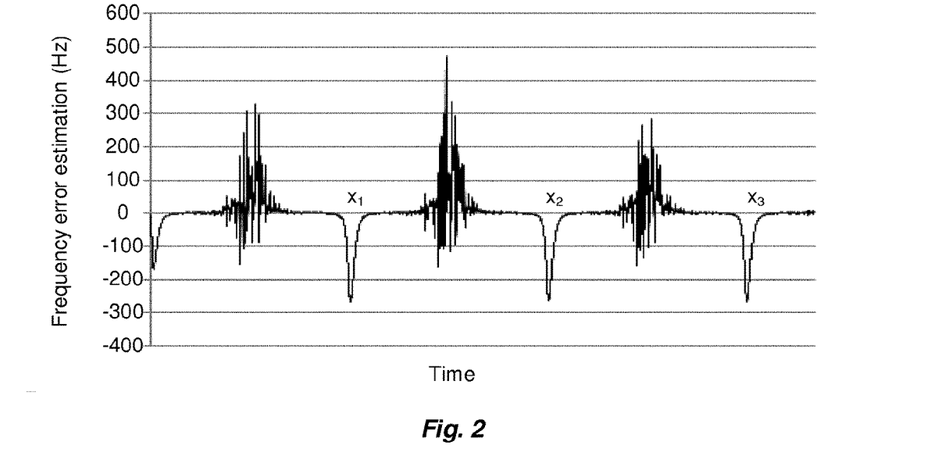
FIG. 2 is a graph that illustrates AFC behavior.

As summarized above, the procedure that is used to detect that the wireless communication device is in a HS environment comprises two parts. The first part is to detect that the wireless communication device is actually in a HS environment. The second part is to detect that the train receives paths with a large difference of the corresponding Doppler frequency shifts, by detecting that the AFC does not work properly. In this situation the AFC algorithm needs to be changed and the demodulation algorithm may also need adaptation, e.g. changed or tuned to larger frequency offsets. Embodiments of such a scheme will now be described in some more detail. Reference will initially be made to FIG. 1 and FIG. 2.

An important point is that the low-speed AFC and demodulation algorithms already running in the wireless communication device 101 can be used when there is one dominant downlink signal path with one Doppler shift received by the wireless communication device 101. In FIG. 1, such a dominant path is illustrated by both signals 111 and 121 (remembering that it is a bidirectional scenario). The degradation for the low-speed AFC and demodulation algorithm occurs when the two paths 111, 121 with different Doppler shifts are received within approximately the same chip time. A reason for this is that in such a situation the frequency estimation in frequency control algorithm changes back and forth between the two frequencies every time a new frequency estimation is performed. The frequency estimation can be done four time per millisecond based on the rate of pilot symbols. By this variation of the frequency estimation and hence the frequency controlled by the AFC changes fast and that degrades the receiver performance.

It is however to be noted that there may be other reasons for an unstable AFC. For example in a Doppler spread channel at very low SNR, the AFC may have problems to lock at the correct frequency. In this case a change of receiver algorithms will degrade the performance even more. Consequently, the AFC algorithm and demodulation algorithms shall only be changed in case the wireless communication device 101 is determined to be in a HS environment.

Based on this, the present disclosure provides embodiments that involve 1) a detection that the wireless communication device 101 is in a HS environment and when that is the case 2) a detection that the received paths from the forward direction and backward direction have similar power causing an instability problem with the frequency control loop.

The detection that the wireless communication device 101 is in a HST environment may be based on that the wireless communication device detects several paths where the Doppler frequency of each path can have one of two Doppler shifts, either the same as the dominant path or another frequency where the difference in frequency is high. These are illustrated by paths 111 and 121. There might be several paths, illustrated by signals 112, 122, with varying Doppler shifts but these are disregarded here.

The detection that the AFC frequency loop in the wireless communication device receiver is unstable may be based on that the variance of the deltas between the last N frequency error estimations by the AFC algorithm is very high. FIG. 2 shows the frequency correction each time the AFC is executed when there are only LOS propagation paths, i.e. path 111 and 121. The positions X1, X2 and X3 are when the UE is passing radio heads (i.e. antenna nodes) 105, 107 and 109 in FIG. 1. It is seen that in the middle between the antenna nodes there are large "random" corrections. On the other hand before and after passing the antenna node there are only minor corrections and when passing the antenna node there are AFC corrections to be able to switch frequency from the large positive Doppler shift to the large negative Doppler shifts after passing the antenna node.

The variance of the actual frequency corrections could also be used to determine AFC instability, because the variance of the frequency error estimations is also high when passing an antenna node (e.g. at positions x1, x2 and x3 illustrated in FIG. 1) and in this case the frequency correction shall be kept as the low-speed correction. The AFC is in such a case not unstable; the frequency just need to be switched fast since the wireless communication device is passing an antenna node and therefore the Doppler frequency shift changes very fast. FIG. 2 shows corresponding frequency correction spikes at positions x1, x2 and x3, where the UE when passing an antenna node first when going towards the antenna node, the dominant path is received with a large positive Doppler shift, while after passing the antenna node, e.g. 102, the signal is received from the back and the Doppler changes very fast to a large negative Doppler shift.

However the difference between two estimations is not changing very fast when passing a radio head since the frequency error is changing quite consistently. The frequency error value between two frequency estimations is on the other hand changing very fast when the AFC algorithm is unstable. Therefore the variance of the difference between two measured frequency values, that is when the derivative of the frequency error is changing fast, is a good metric for changing the behavior of the AFC loop.

Figure 3A:
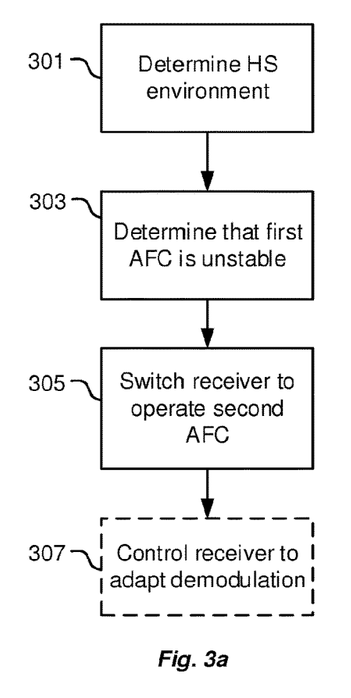
FIGS. 3a-d are flowcharts of embodiments of methods.

Turning now to FIG. 3a and with continued reference to FIGS. 1 and 2, the above situation will now be described with reference to a number of actions in a method performed by a wireless communication device such as the wireless communication device 101. The method is for controlling a radio receiver and the radio receiver receives radio frequency, RF, signals in the wireless communication device.

Action 301

A determination is made that the wireless communication device is located in a high speed, HS, environment.

Action 303

As a consequence of the determination in action 301 that the wireless communication device is located in the HS environment, a determination is made that a first automatic frequency control, AFC, function operating on the RF signals is unstable.

Action 305

As a consequence of the determination in action 303 that the first AFC function is unstable the radio receiver is switched to operate a second AFC on the RF signals.

Action 307

In addition to the switching in action 305, the radio receiver may be controlled to also adapt demodulation of the RF signals to the second AFC function, for example by changing demodulation function from a first to a second function.

Figure 3B:
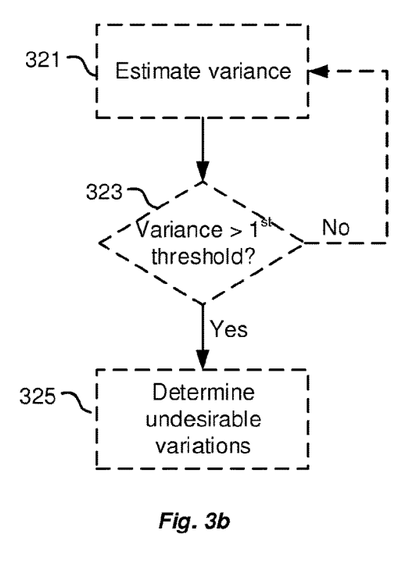

Regarding the determination in action 303 that the first AFC function is unstable, it may comprise a determination that frequency estimations by the first AFC function have an undesirable variation. For example, as illustrated in FIG. 3b, the determination that frequency error estimations by the first AFC function have an undesirable variation may comprise actions as follows.

Action 321

An estimation is made of a variance of differences between a number, N, of frequency error estimations of the RF signals by the first AFC function. For example, it may be the last N sequential (or every second, third, fourth etc.) estimations.

Action 323

A comparison is made of the variance estimated in action 321 with a first variance threshold.

Action 325

A determination is then made, if the estimated variance is greater than the first variance threshold, that the frequency error estimations by the first AFC function have an undesirable variation.

The expressions unstable and undesirable are to be understood as expressions that characterize the frequency error estimation varying very much every time the AFC is executed. Hence, if the AFC uses the frequency error estimation, then the carrier frequency used in the demodulation changes with rather large steps continuously. One definition of such a process is that the estimated variance of the frequency steps (frequency error estimations) from the last (e.g. N) frequency error estimations is large, larger than a threshold (e.g. the first variance threshold).

In various embodiments, the first variance threshold may be a fixed value based on a sum of at least one estimated variance and a predetermined variance margin. The value of such a fixed threshold may be tuned based on the variance during the conditions when the wireless communication device 101 is connected to one antenna node (e.g. antenna node 105) with a margin added so that there will not be too many false alarms when not needed.

Alternatively, in some embodiments the first variance threshold may be an adaptive value based on a plurality of estimated variances. With regard to this adaptive threshold value, it can be noted that the wireless communication device 101 monitors the variance when signals from one antenna node is dominant (e.g. antenna node 105) and adjusts the threshold based on that. This adaptation is rather slow so when the variance increases fast, due to that signals from two antenna nodes (e.g. both antenna nodes 105 and 107) are received and none of the antenna nodes is dominant, then the variance increases faster than the adjustment and triggers the receiver to go into the other AFC mode. With this setting the first variance threshold is tuned to the actual channel conditions.

With regard to the second AFC function, with which the radio receiver in the wireless communication device 101 is controlled to operate (as defined in action 305), it may be any of a fixed frequency and a slow frequency control function. That is, the second AFC function may be either a fixed frequency setting or the frequency setting may be based on a filtered value of the frequency error estimation or that it changes the frequency setting by a fraction of the frequency step suggested from the frequency error estimation performed in the AFC. Another option is that the wireless communication device 101 estimates (based on previous changes of antenna nodes with which it communicates) the frequency difference in relation to the next antenna node and adjusts the frequency slowly with a fixed rate in order to have the correct frequency when the next antenna node is dominant, i.e. when the wireless communication device 101 approaches, e.g., antenna node 107.

With regard to the adaption of the demodulation, e.g. changing to a second demodulation function, such demodulation function shall be able to handle the case with two groups of Doppler frequency shifts leading to a large Doppler spread. It can either be done, e.g., as an advanced receiver proposed in study item (SI) report R4-157700 of the 3GPP TSG-RAN WG4 Meeting #77, where the UE tracks the two received frequencies ((carrier frequency+Doppler frequency shift) and (carrier frequency−Doppler frequency shift)) independently and use both of these frequencies in the demodulation algorithm, or it can be done as an adaptation of the demodulation algorithm used for the fading channels adapted to larger Doppler spread than normal.

Figure 3C:
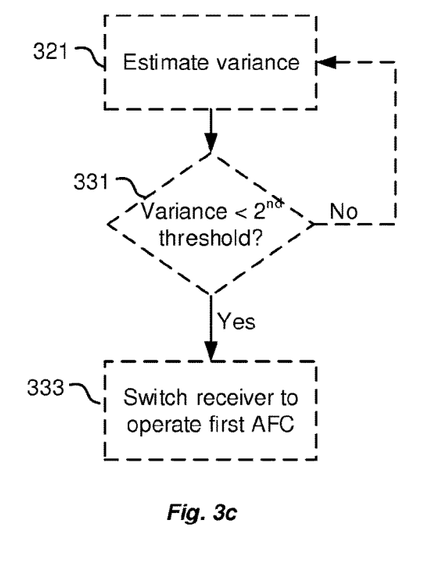

With reference to FIG. 3c, the radio receiver may further be controlled to operate the second AFC function on the RF signals by the following actions.

Action 331

A comparison is made of the (in action 321) estimated variance with a second variance threshold.

Action 333

If the estimated variance is less than the second variance threshold, the radio receiver is then switched to operate the first AFC function on the RF signals. In other words, a kind of hysteresis process takes place in order to avoid unnecessary so-called "ping-ponging" between operation of the first and second AFC functions.

Figure 3D:
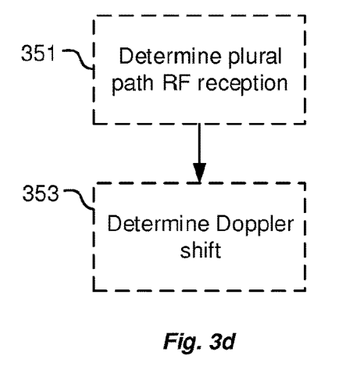

With regard to action 301, the determination that the wireless communication device is located in a HS environment may comprise actions as illustrated in FIG. 3d.

Action 351

A determination is made that the radio receiver receives the RF signals via a plurality of reception paths. For example, as illustrated in FIG. 1, at least signals denoted 111, 121 exemplify such reception paths.

Action 353

A determination is then made that the received RF signals have a respective Doppler shift, the respective Doppler shift being separated by a frequency that is larger than a frequency threshold, f_Thr.

Regarding the Doppler shift, it is present due to the fact that the wireless communication device 101 is moving with speed v either towards or away from an antenna node, i.e. antenna node 105 and antenna node 107 in FIG. 1, respectively. In any case, due to this movement, the frequency seen by the wireless communication device receiver changes by the Doppler shift f_d=v/c*f_c where v is speed in m/s, c is speed of light in m/s and f_c is the carrier frequency. Thereby the frequency from the antenna node 105 the wireless communication device 101 is leaving is 2*f_d lower than the frequency of the signal received from the antenna node 107 the wireless communication device 101 is heading towards.

Figure 4:
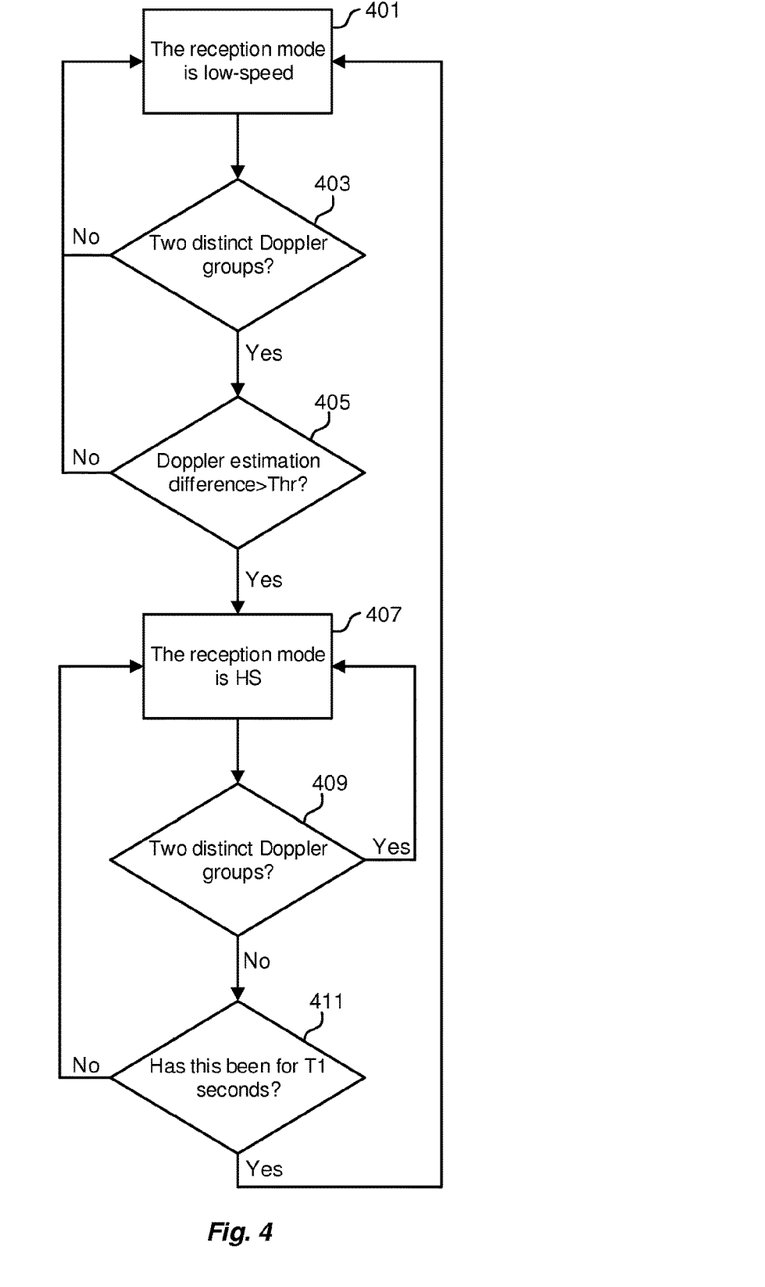
FIG. 4 is a flowchart of a method.
Figure 5:
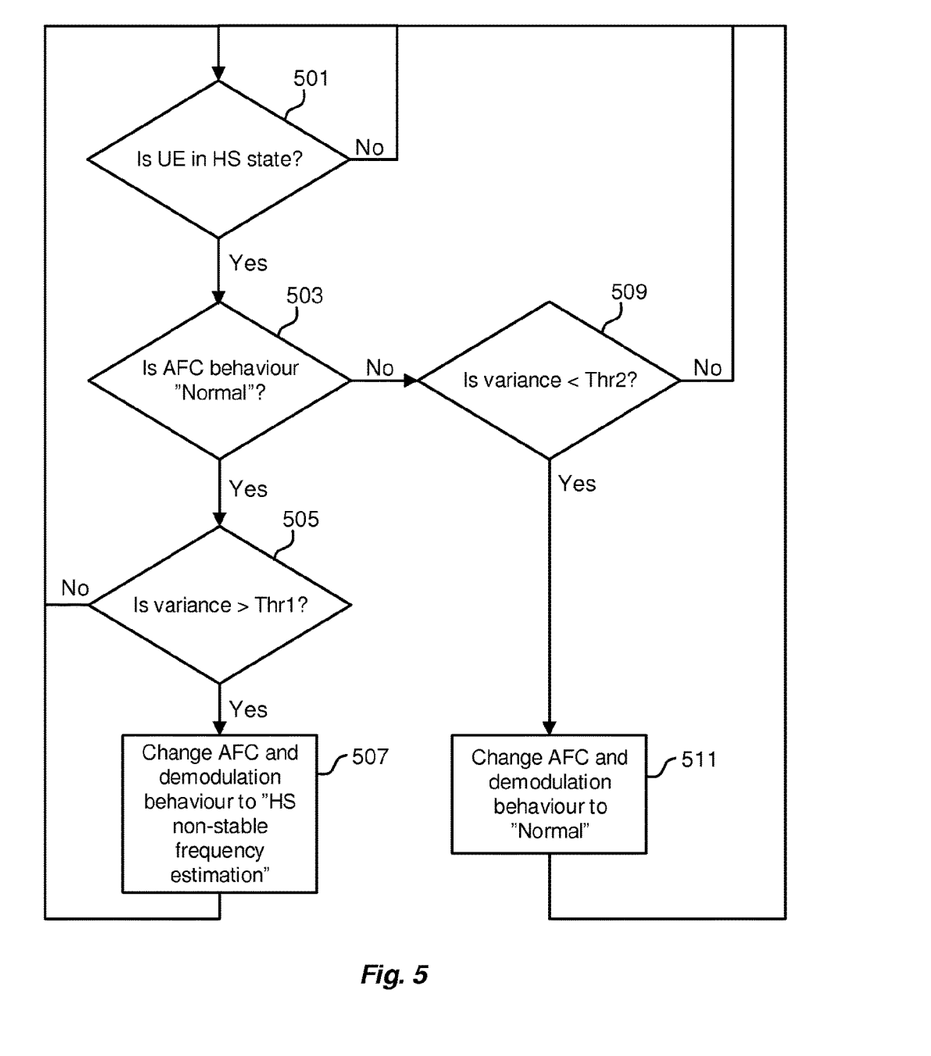

Turning now to FIG. 4 and FIG. 5 and with continued reference to FIGS. 1 and 2, embodiments of a method performed by a wireless communication device for controlling a radio receiver will be described using so-called state machine terminology.

In FIG. 4, the wireless communication device 101 checks whether the wireless communication device 101 is in a HS state or not. As indicated above, a HS state means that there are two distinct Doppler shifts of the signals in the received paths, meaning that each signal path has either of the two Doppler shifts where the two Doppler shifts are separated by at least f_Thr, corresponding the difference in frequency of +f_d and −f_d.

Specifically, in FIG. 4, the wireless communication device 101 is initially in state 401 where the reception mode is low-speed.

When the wireless communication device 101 is in state 401, a check 403 is made whether the Doppler estimations of different paths can be grouped into two distinct groups, then, a check 405 is made whether the difference in Doppler frequency estimation between the two groups is larger than the first threshold, and if that is the case, the wireless communication device 101 is in a state 407 where the reception mode is HS. If none of the conditions 403 and 405 are fulfilled, the wireless communication device 101 remains in state 401 where the reception mode is low-speed.

When the wireless communication device 101 is in state 407, a check 409 is made whether the Doppler estimations of different paths are possible to group in two distinct groups and, if that is the case, the wireless communication device 101 remains in state 407 where the reception mode is HS. If it is not the case that the Doppler estimations of different paths are possible to group in two distinct groups, a check 411 is made whether this has been the case for a duration longer than T1 seconds and if that is the not the case, the wireless communication device 101 remains in state 407 where the reception mode is HS, but if it has been the case for the duration longer than T1 seconds, then the wireless communication device 101 returns to state 401 where the reception mode is low-speed.

FIG. 5 illustrates a change between when the wireless communication device 101 AFC is stable (in which the AFC and channel estimation can work as normal) and when the AFC is "unstable, mainly between the two Doppler shifts, but can also be somewhere in between, and the frequency error estimation jumps between these Doppler shifts randomly after each frequency error estimation by the AFC. Then a more stable AFC setting is applied together with a channel estimation based on a large frequency uncertainty alternatively based on the two known Doppler shifts.

That is, FIG. 5 illustrates in more detail, the operation of a state machine that operates in the situation when the wireless communication device 101 is in the HS mode, i.e. state 407 as described above. A check 501 is made whether the wireless communication device 101 is in the HS mode. If that is the case, a check 503 is made whether the AFC behaviour is "Normal", i.e. not unstable. If it is not unstable, then a check 505 is made whether the variance, e.g. as estimated from the last N frequency estimations of the difference between two sequential frequency error estimations, is greater than the first threshold Thr1. If the estimated variance is greater than the first threshold, then the AFC behaviour is changed to a state 507 in which becomes "HST Non-stable frequency estimations", i.e. the second AFC and demodulation functions as discussed above are operating in this state.

If it is found, in check 503, that the AFC behaviour is not "Normal", i.e. unstable, then a check 509 is made whether the variance (e.g. estimated from the last N frequency error estimations) of the difference between two contiguous frequency error estimations is less than the second threshold Thr2. If the variance is less than the second threshold, then the AFC and possibly also demodulation behaviour is changed to a state 511 in which it becomes "Normal", i.e. the first AFC function, as discussed above, is operating in this state.

Figure 6:
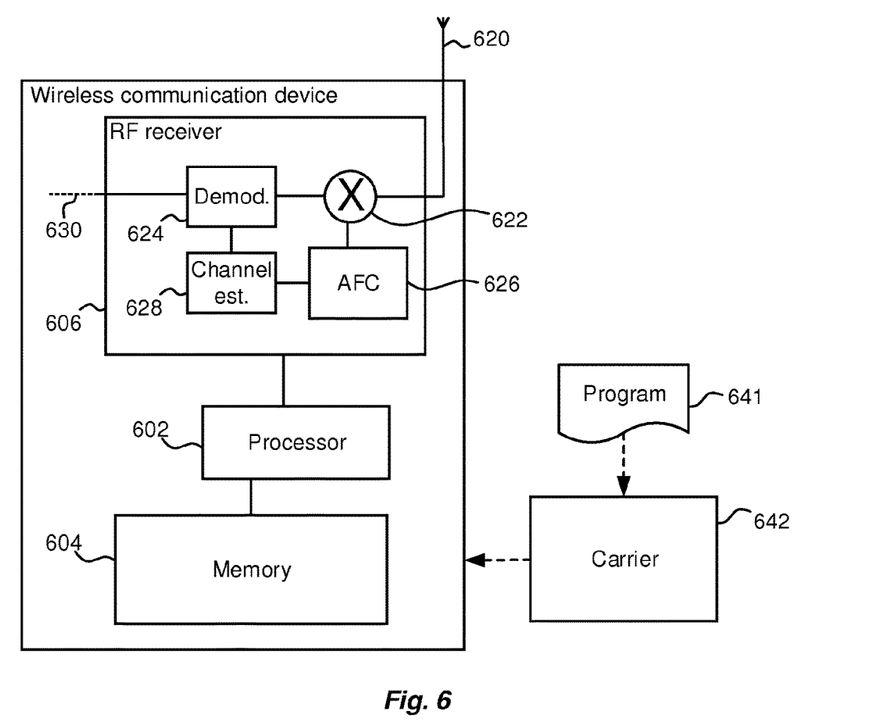

Turning now to FIG. 6, a wireless communication device 600 will be described in some more detail. The wireless communication device 600 comprises a radio receiver 606. The radio receiver 606 is configured to receive radio frequency, RF, signals in the wireless communication device. The radio receiver 606 comprises an antenna 620, a mixer 622, an AFC function 626, a demodulator 624 and a channel estimator 628. Further, the wireless communication device 600 comprises a processor 602 and a memory 604. The memory contains instructions executable by the processor 602 whereby the wireless communication device 600 is operative to:

determine that the wireless communication device is located in a high speed, HS, environment and, as a consequence of the determination that the wireless communication device is located in the HS environment,     determine that a first automatic frequency control, AFC, function operating on the RF signals is unstable and, as a consequence of the determination that the first AFC function is unstable,     switch the radio receiver to operate a second AFC function on the RF signals.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the wireless communication device 600 is operative such that the switch of the radio receiver is accompanied by adapting demodulation of the RF signals to the second AFC function.

In some embodiments, the wireless communication device 600 is operative such that the determination that the first AFC function is unstable comprises a determination that frequency error estimations by the first AFC function have an undesirable variation.

In some embodiments, the wireless communication device 600 is operative such that the determination that frequency error estimations by the first AFC function have an undesirable variation comprises:

estimating a variance of differences between a number, N, of frequency error estimations of the RF signals by the first AFC function,     comparing the variance with a first variance threshold, and     determining, if the variance is greater than the first variance threshold, that the frequency error estimations by the first AFC function have an undesirable variation.

In some embodiments, the wireless communication device 600 is operative such that the first variance threshold is a fixed value based on a sum of at least one estimated variance and a predetermined variance margin.

In some embodiments, the wireless communication device 600 is operative such that the first variance threshold is an adaptive value based on a plurality of estimated variances.

In some embodiments, the wireless communication device 600 is operative such that the second AFC function is any of a fixed frequency and a slow frequency control function.

In some embodiments, the wireless communication device 600 is operative such that the radio receiver is being controlled to operate the second AFC function on the RF signals by:

comparing the estimated variance with a second variance threshold, and
   switching, if the estimated variance is less than the second variance threshold, the radio receiver to operate the first AFC function on the RF signals.

In some embodiments, the wireless communication device 600 is operative such that the determination that the wireless communication device is located in a HS environment comprises:

determining that the radio receiver receives the RF signals via a plurality of reception paths,
   determining that the received RF signals have a respective Doppler shift separated by a frequency that is larger than a frequency threshold, f_Thr.

Figure 7:
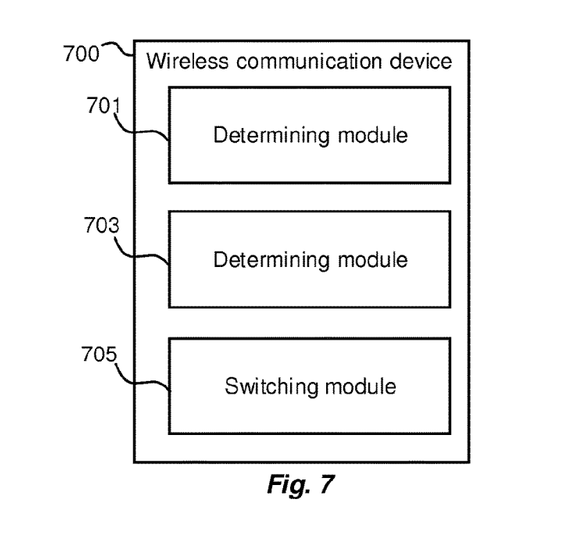

FIG. 7, illustrates schematically a wireless communication device 700. The wireless communication device 700 comprises:

a determination module 701 configured to determine that the wireless communication device is located in a high speed, HS, environment and, as a consequence of the determination that the wireless communication device is located in the HS environment,
   a determination module 703 configured determine that a first automatic frequency control, AFC, function operating on the RF signals is unstable and, as a consequence of the determination that the first AFC function is unstable, and
   a switching module 705 configured switch the radio receiver to operate a second AFC on the RF signals.

The wireless communication device 700 may comprise further modules that are configured to perform in a similar manner as, e.g., the wireless communication device 600 described above in connection with FIG. 6.

The invention claimed is:

1. A method performed by a wireless communication device for controlling a radio receiver, the radio receiver receiving radio frequency, RF, signals in the wireless communication device, the method comprising:

determining that the wireless communication device is located in a high speed, HS, environment and, as a consequence of the determination that the wireless communication device is located in the HS environment:
      determining that a first automatic frequency control, AFC, function operating on the RF signals is unstable, determining that the first AFC function is unstable comprises determining that frequency error estimations by the first AFC function have an undesirable variation, determining that frequency error estimations by the first AFC function have an undesirable variation comprises:
         estimating a variance of differences between a number, N, of frequency error estimations of the RF signals by the first AFC function;
         comparing the variance with a first variance threshold; and
         determining, if the variance is greater than the first variance threshold, that the frequency error estimations by the first AFC function have an undesirable variation;
      and, as a consequence of the determination that the first AFC function is unstable:
         switching the radio receiver to operate a second AFC function on the RF signals.

2. The method of claim 1, wherein the switching of the radio receiver is accompanied by adapting demodulation of the RF signals to the second AFC function.

3. The method of claim 1, wherein the first variance threshold is a fixed value based on a sum of at least one estimated variance and a predetermined variance margin.

4. The method of claim 1, wherein the first variance threshold is an adaptive value based on a plurality of estimated variances.

5. The method of claim 1, wherein the second AFC function is any of a fixed frequency and a slow frequency control function.

6. The method of claim 1, wherein the radio receiver is being controlled to operate the second AFC function on the RF signals by:

comparing the estimated variance with a second variance threshold; and
   switching, if the estimated variance is less than the second variance threshold, the radio receiver to operate the first AFC function on the RF signals.

7. The method of claim 1, wherein the determination that the wireless communication device is located in a HS environment comprises:

determining that the radio receiver receives the RF signals via a plurality of reception paths; and
   determining that the received RF signals have a respective Doppler shift separated by a frequency that is larger than a frequency threshold, f_Thr.

8. A wireless communication device comprising a radio receiver, the radio receiver being configured to receive radio frequency, RF, signals in the wireless communication device, the wireless communication device comprising a processor and a memory, the memory containing instructions executable by the processor to configure the wireless communication device to:

determine that the wireless communication device is located in a high speed, HS, environment and, as a consequence of the determination that the wireless communication device is located in the HS environment:
      determine that a first automatic frequency control, AFC, function operating on the RF signals is unstable, determining that the first AFC function is unstable comprises determining that frequency error estimations by the first AFC function have an undesirable variation, determining that frequency error estimations by the first AFC function have an undesirable variation comprises:
         estimating a variance of differences between a number, N, of frequency error estimations of the RF signals by the first AFC function;
         comparing the variance with a first variance threshold; and
         determining if the variance is greater than the first variance threshold, that the frequency error estimations by the first AFC function have an undesirable variation;
      and, as a consequence of the determination that the first AFC function is unstable:
         switch the radio receiver to operate a second AFC function on the RF signals.

9. The wireless communication device of claim 8, configured such that the switch of the radio receiver is accompanied by adapting demodulation of the RF signals to the second AFC function.

10. The wireless communication device of claim 8, configured such that the first variance threshold is a fixed value based on a sum of at least one estimated variance and a predetermined variance margin.

11. The wireless communication device of claim 8, configured such that the first variance threshold is an adaptive value based on a plurality of estimated variances.

12. The wireless communication device of claim 8, configured such that the second AFC function is any of a fixed frequency and a slow frequency control function.

13. The wireless communication device of claim 8, configured such that the radio receiver is being controlled to operate the second AFC function on the RF signals by:
    comparing the estimated variance with a second variance threshold; and
    switching, if the estimated variance is less than the second variance threshold, the radio receiver to operate the first AFC function on the RF signals.

14. The wireless communication device of claim 8, configured such that the determination that the wireless communication device is located in a HS environment comprises:
    determining that the radio receiver receives the RF signals via a plurality of reception paths; and
    determining that the received RF signals have a respective Doppler shift separated by a frequency that is larger than a frequency threshold, f_Thr.

15. A computer storage device storing instructions which, when executed on at least one processor in a wireless communication device, cause the wireless communication device to:
    determine that the wireless communication device is located in a high speed, HS, environment and, as a consequence of the determination that the wireless communication device is located in the HS environment:
        determine that a first automatic frequency control, AFC, function operating on the RF signals is unstable, determining that the first AFC function is unstable comprises determining that frequency error estimations by the first AFC function have an undesirable variation, determining that frequency error estimations by the first AFC function have an undesirable variation comprises:
            estimating a variance of differences between a number, N, of frequency error estimations of the RF signals by the first AFC function;
            comparing the variance with a first variance threshold; and
            determining if the variance is greater than the first variance threshold, that the frequency error estimations by the first AFC function have an undesirable variation;
        and, as a consequence of the determination that the first AFC function is unstable:
            switching the radio receiver to operate a second AFC function on the RF signals.

* * * * *